Patented Jan. 26, 1943

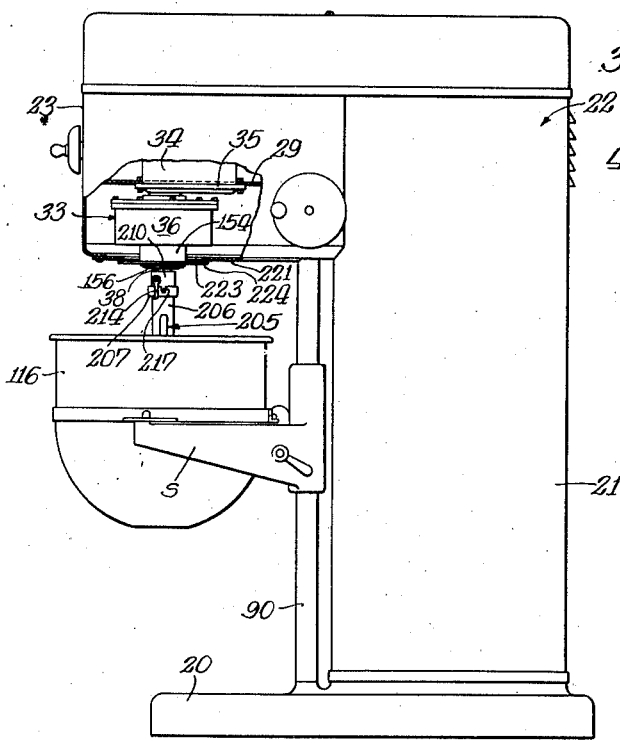
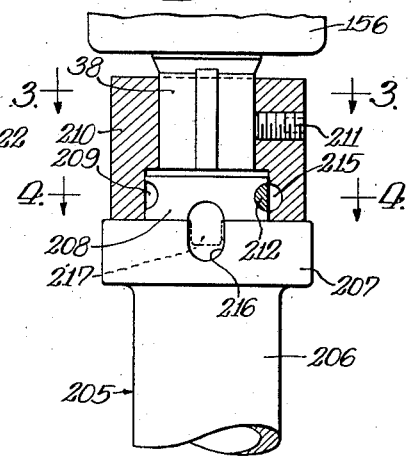
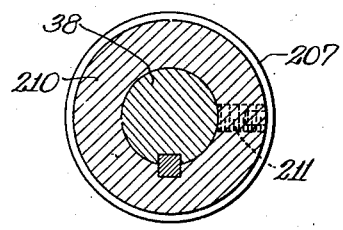
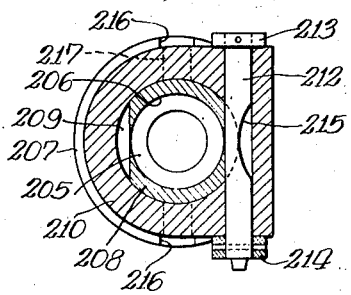
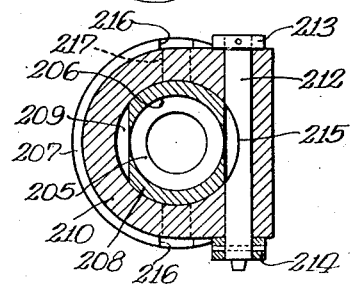
Jan. 26, 1943.  E. J. KARP  2,309,249
SECURING MEANS
Original Filed April 25, 1941
INVENTOR.
Edward J. Karp.

2,309,249

UNITED STATES PATENT OFFICE 2,309,249

SECURING MEANS

Edward J. Karp, Cicero, Ill., assignor to G. S. Blakeslee & Co., Cicero, Ill., a corporation of Illinois Original application April 25, 1941, Serial No. 390,229. Divided and this application July 27, 1942, Serial No. 452,456

5 Claims. (Cl. 287—119)

This invention relates to securing means for removably securing or mounting a member or attachment to or upon a member of a machine in cooperating relation to a part of the latter so as to be driven thereby.

My invention is directed to securing means of such character that the member or attachment may be mounted on or secured to a member of a machine with expedition and facility so as to be in cooperating relation to and driven by a part of the machine. More specifically, I provide a collar or analogous element of one of the members with a locking pin disposed, when in locking position, to engage into a cooperating groove in a portion of the other member so as to secure the two members together and confine them against relative endwise movement or turning movement, this locking pin, when in its releasing position, being clear of the groove and permitting ready separation of the two members. Further objects and advantages of my invention will appear from the detail description.

In the drawing:

Figure 1 is a side view, partly broken away, of a mixing machine showing securing means embodying my invention applied thereto;

Figure 2 is a central vertical sectional view through the attaching collar secured on the driven shaft of the mixing machine and associated parts, the driven shaft and the upper portion of an attachment secured thereto being shown in elevation;

Figure 3 is a sectional view taken substantially on line 3—3 of Figure 2;

Figure 4 is a sectional view taken substantially on line 4—4 of Figure 2, certain parts being shown in plan; and Figure 5 is a view similar to Figure 4 but showing the locking pin in its releasing position.

This application is a division of my application for Mixing machine, Serial No. 390,229, filed April 25, 1941.

The mixing machine with which the securing means of my instant invention is particularly intended to be used is disclosed in detail in my above identified copending application, and a brief description of that machine will suffice here. It comprises a base 20, a column 21 extending upward from the base, provided at its upper end with a head 22 having a portion extending forwardly from column 21 and providing an overhang 23 in the form of a housing, and a diaphragm plate 29 welded or otherwise suitably secured in overhang 23. A transmission unit 33, comprising an upper gear housing 34 and a lower gear housing 36, is mounted in overhang 23, conveniently by bolting to diaphragm plate 29 a flange 35 at the lower end of gear housing 34. The lower gear housing 36 is supported from upper gear housing 34 for rotation about an axis eccentric thereto and is provided, at its lower end, with an eccentrically disposed collar 154 to the lower end of which is secured a cap 156. Suitable means is provided for driving transmission unit 33, and a driven shaft 38, extending downward through collar 154 and cap 156, is rotated about its own axis and revolves with gear case 36 about the axis of rotation of the latter, during operation of the transmission unit. Overhang 23 is provided with a bottom closure plate 221, suitably secured in position and provided with an opening 223 of suitable diameter to accommodate travel of collar 154 with lower gear housing 36. A splash plate 224, of somewhat greater diameter than opening 223, is disposed below and adjacent plate 221 and is clamped between collar 154 and cap 156. A mixing bowl support s of suitable size and shape is slidably mounted on two guide rods, one of which is shown and designated by reference number 90, extending between base 20 and overhang 23, and suitable means is provided for effecting vertical adjustment of support s. The support s is provided with suitable means for mounting thereon a mixing bowl 116 in underlying relation to shaft 38 and properly disposed to receive an attachment mounted on that shaft.

Shaft 38 is intended for reception of various attachments, as previously stated. In Figure 1, I have shown a beater 205 extending downward into mixing bowl 116, this beater having an upwardly extending tubular shank 206, as appears more clearly from Figure 2. Shank 206 is provided, at its upper end, with a shoulder 207 from which extends a reduced stud 208, provided at opposite sides thereof with transverse grooves 209 of arcuate cross section. Stud 208 fits snugly into the lower end portion of an attaching collar 210 keyed on shaft 38 and secured thereto by a set screw 211. A cylindrical locking pin 212 is mounted in collar 210 for turning movement, and is confined against endwise movement therethrough by a collar 213 secured on one end of this pin and an operating handle 214 secured on the other end thereof. Pin 212 is cut out from one side at its mid portion to provide an arcuate recess 215 conforming in curvature to the stud 208. Shoulder 207 and stud 208 of shank 206 are provided, at opposite sides thereof, with slots 216 for reception of two lugs 217 extending downward from collar 210, at opposite sides thereof. When lugs 217 are disposed in slots 216, one of the grooves 209 of stud 208 is disposed adjacent and parallel with locking pin 212. In order that stud 208 may be inserted into the lower end portion of collar 210, pin 212 is turned into position such that recess 215 is disposed inward so as to offer no obstruction to insertion of stud 208, as shown in Figure 5. After the beater 205 or other attachment has been properly positioned with respect to collar 210, pin 212 is turned into the position shown in Figure 4, in which the unrecessed inner portion of the pin intersects the bore at the lower end of sleeve 210 and engages into one of the grooves 209. In that manner the attachment is locked in collar 210 and secured thereto for rotation therewith and with shaft 38.

I have shown the securing means of my invention as used for securing an attachment directly to a rotating shaft for rotation therewith, by way of example, for which purpose it is particularly well suited. It will be understood, however, that my invention, in its broader aspects, may be used for various purposes and comprehends a collar or analogous member and a second member to be mounted in cooperating relation to the first member and a part of the machine, one of the members having a groove therein and the other member having a locking pin turnable into position engaging into the groove for securing the two members together. It will be noted from Figures 4 and 5 that the groove 209 for receiving the locking pin 212 is straight lengthwise, so that pin 212 would prevent turning of stud 208 in collar 210 if the lugs 217 were omitted. In certain cases the locking pin 212 may be relied upon for holding against turning movement the part with which it engages, and the lugs 217 or equivalent means may be omitted. The variations above referred to are disclosed in my copending application Serial No. 390,229 and are intended to be included in the instant application, but are not illustrated and described here in detail since that is not thought essential to an understanding of my instant invention.

As above indicated, changes in construction and arrangement of parts of my invention may be resorted to without departing from the field and scope thereof, and I intend to include all such variations, as fall within the scope of the appended claims, in this application in which the preferred form only of my invention has been disclosed.

I claim:

1. In a machine of the character described, a driven shaft, a tubular member in fixed relation to said shaft, an attachment having a cylindrical extension fitting into said member and provided with a transverse groove in its circumferential surface straight lengthwise and of arcuate cross section, and a cylindrical locking pin mounted in said tubular member cut out at one side conformably to the curvature of said extension, said pin being confined against movement radially of said shaft and against lengthwise movement while being free for turning movement into a locking position with its other side portion engaging in said groove and a releasing position with said cut out side presented to said extension.

2. In a machine of the character described, a driven shaft and means for mounting an attachment having a cylindrical extension in cooperative relation to said shaft to be driven thereby, said means comprising a tubular member having a cylindrical bore for reception of the cylindrical extension of the attachment, and a cylindrical pin mounted in said tubular member transversely of the axis thereof cut out at one side conformably to the curvature of said bore, said pin being confined against movement radially of said shaft and against lengthwise movement while being free for turning movement into a releasing position with said cut out side presented to said bore and a locking position with its other side portion intersecting said bore.

3. In a machine of the character described, a driven shaft, and means for mounting an attachment having a cylindrical extension in cooperative relation to said shaft to be driven thereby, said means comprising a collar secured on said shaft defining at its lower portion a cylindrical bore for reception of the cylindrical extension of the attachment, and a cylindrical pin mounted in said lower portion of said collar transversely thereof cut out at one side conformably to the curvature of said bore, said pin being confined against movement radially of said shaft and against lengthwise movement while being free for turning movement into a releasing position with said cut out side presented to said bore and a locking position with its other side portion intersecting said bore.

4. In a machine of the character described, a driven shaft having at one end a collar fixed thereto defining a cylindrical socket, an attachment having a stud fitting into said socket and provided at one side with a transverse groove of arcuate cross section, a locking pin mounted in said collar cut out at one side conformably to the curvature of said stud, said pin being confined against movement radially of said shaft and against lengthwise movement while being free for turning movement into a locking position with its other side portion engaging in said groove and a releasing position with said cut out side presented to said stud, and cooperating lug and slot means carried by said collar and said attachment providing a positive driving connection therebetween for transmitting the torque of said shaft to said attachment.

5. In a machine of the character described, a driven shaft having at one end a collar fixed thereto defining a cylindrical socket, an attachment having a reduced stud fitting into said socket and a shoulder seating against said collar forming a closure therewith and providing a stop limiting relative axial movement between said collar and said attachment, said stud being provided at one side with a transverse groove of arcuate cross section, a locking pin mounted in said collar cut out at one side conformably to the curvature of said stud, said pin being confined against movement radially of said shaft and against lengthwise movement while being free for turning movement into a locking position with its other side engaging in said groove and a releasing position with said cut out side presented to said stud, and cooperating lug and slot means carried by said collar and said shoulder providing a positive driving connection therebetween for transmitting the torque of said shaft to said attachment.

EDWARD J. KARP.

CERTIFICATE OF CORRECTION.

Patent No. 2,309,249.　　　　　　　　　　　　　　　January 26, 1943.

EDWARD J. KARP.

It is hereby certified that error appears in the printed specification of the above numbered patent requiring correction as follows: Page 2, first column, lines 71 and 72, claim 2, strike out the words "locking position with its other side portion engaging in said groove and a releasing position" and insert the same after "a" in line 66, claim 1; and that the said Letters Patent should be read with this correction therein that the same may conform to the record of the case in the Patent Office.

Signed and sealed this 16th day of March, A. D. 1943, (Seal)　　　　　　　　　　　　　　　　　　　Henry Van Arsdale,
　　　　　　　　　　　　　　　　　　　Acting Commissioner of Patents.